US007148782B2

(12) United States Patent
Hirzel

(10) Patent No.: US 7,148,782 B2
(45) Date of Patent: Dec. 12, 2006

(54) MAGNETIC CORE FOR STATIONARY ELECTROMAGNETIC DEVICES

(75) Inventor: Andrew Hirzel, Kalamazoo, MI (US)

(73) Assignee: Light Engineering, Inc., Indianapolis, IN (US)

( * ) Notice: Subject to any disclaimer, the term of this patent is extended or adjusted under 35 U.S.C. 154(b) by 180 days.

(21) Appl. No.: 10/831,820

(22) Filed: Apr. 26, 2004

(65) Prior Publication Data

US 2005/0237146 A1 Oct. 27, 2005

(51) Int. Cl.
*H01F 27/24* (2006.01)
*H02K 3/04* (2006.01)

(52) U.S. Cl. ...................... 336/212; 336/234; 310/208; 310/216

(58) Field of Classification Search ................ 336/212, 336/234, 178, 210, 217; 310/208, 216
See application file for complete search history.

(56) References Cited

U.S. PATENT DOCUMENTS

| | | | | |
|---|---|---|---|---|
| 4,205,288 | A * | 5/1980 | Lin et al. | 336/5 |
| 4,345,229 | A * | 8/1982 | Alley et al. | 336/83 |
| 4,603,314 | A | 7/1986 | Fukunaga et al. | |
| 4,940,913 | A * | 7/1990 | Fritzsche | 310/216 |
| 5,208,503 | A | 5/1993 | Hisey | |
| 5,331,304 | A | 7/1994 | White et al. | |
| 5,617,526 | A * | 4/1997 | Oran et al. | 715/779 |
| 5,731,649 | A | 3/1998 | Caamano | |
| 6,583,530 | B1 * | 6/2003 | Hsu | 310/254 |
| 6,583,707 | B1 | 6/2003 | Ngo et al. | |
| 6,668,444 | B1 | 12/2003 | Ngo et al. | |
| 6,784,588 | B1 * | 8/2004 | DeCristofaro et al. | 310/216 |
| 6,909,352 | B1 * | 6/2005 | Hobson et al. | 336/178 |
| 2001/0033216 | A1 | 10/2001 | Shirahata et al. | |
| 2003/0020579 | A1 | 1/2003 | Ngo et al. | |
| 2003/0128094 | A1 | 7/2003 | Ngo et al. | |

* cited by examiner

*Primary Examiner*—Anh Mai
(74) *Attorney, Agent, or Firm*—Ernest D. Buff & Associates, LLC; Ernest D. Buff; Gordon E. Fish

(57) ABSTRACT

An energizable magnetic core for use in an inductor or a transformer includes a plurality of legs extending from the back yoke. The back yoke is formed in a loop arranged to provide a magnetic circuit. Each of the plurality of legs have a first end adjacent to the back yoke and a second end extending away from the back yoke. With the legs positioned upon the back yoke, a cover yoke is positioned adjacent to the second end of each of the plurality of legs. The cover yoke is also formed in a loop such that the cover loop is arranged to provide a magnetic circuit. Coils are positioned upon the legs of the energizable magnetic core. In one embodiment, amorphous metal may be used to construct the energizable magnetic core.

61 Claims, 13 Drawing Sheets

MAGNETIC CORE FOR STATIONARY ELECTROMAGNETIC DEVICES

BACKGROUND

The field of the invention relates to a transformer and/or inductor core. The transformer and/or inductor core may be inexpensively manufactured and provides for low power losses. In addition, the core may be easily designed using magnetic materials that provide improved efficiencies at high frequencies Typical prior art transformer and inductor cores include laminations of ferro-magnetic material assembled into loops that form magnetic circuits. These magnetic circuits may be completely closed or may include air-gaps. Many prior art transformer and inductor cores may be considered discrete rectangular pieces of laminated magnetic material that together form the overall shape of the core. For example, magnetic cores may take the form of an "E" shape formed from five discrete rectangular core components (with a piece to close the open gap) or a "U" shape formed from four discrete rectangular core components (with a piece to close the open gap). An alternative method to forming the magnetic core is to wind magnetic metal ribbon into a toroidal ring or oval. Coil windings are positioned upon the cores to complete the inductors or transformers. Examples of prior art transformer and inductor cores are shown in FIGS. 1A–D.

In building transformer or inductor cores, all legs of the core (including any connecting portion that joins two coil wound legs) are typically of the same cross-sectional area. This allows the lines of magnetic flux to pass equally through the core with as little loss as possible. Unfortunately, this also means that the connecting portions of the core are large and add bulk to the core. It would therefore be advantageous to provide a transformer and/or inductor core arranged such that the overall size of the inductor or transformer could be reduced.

The advent and subsequent study of amorphous metals has caused many to believe that transformers and inductors made with amorphous metal magnetic cores have the potential to provide substantially higher efficiencies and power densities compared to conventional transformers and inductors. In particular, amorphous metals exhibit promising low-loss characteristics, leading many to believe that a magnetic core of amorphous metal would result in a transformer or inductor with increased efficiencies. However, it has proven difficult to effectively manufacture single and multi-phase amorphous metal transformer and inductor cores. In particular, amorphous metal tends to be brittle and difficult to work with and manipulate into desired shapes. Amorphous metal is manufactured in ribbon form, and the ribbon of amorphous metal is generally wound into toroidal rings of the ribbon during manufacture. Thus, the only practical shape that has been used when building transformers or inductors with amorphous metal cores is a ribbon wound oval shape. It would be advantageous to provide alternate shaped amorphous metal cores for transformers and inductors. It would be further advantageous to provide an inductor and/or transformer core assembled from amorphous metal such that the core has low loss characteristics and may be easily manufactured at a low cost.

SUMMARY

An energizable magnetic core for use in an inductor or a transformer includes a plurality of legs extending from the back yoke. The back yoke is formed in a loop arranged to provide a magnetic circuit. In one embodiment, the back yoke is made from a ribbon wound amorphous metal material. Each of the plurality of legs have a first end adjacent to the back yoke and a second end extending away from the back yoke. The plurality of legs may be formed by removing material from the back yoke or by affixing material to the back yoke. For example, if the back yoke is amorphous metal, each of the legs may be formed by cutting into the back yoke and removing material to form the legs or affixing ribbon wound sections of amorphous metal to the back yoke to form the legs. With the legs positioned upon the back yoke, a cover yoke is positioned adjacent to the second end of each of the plurality of legs. The cover yoke is formed of an energizable magnetic material, such as amorphous metal. The cover yoke is also formed in a loop such that the cover loop is arranged to provide a magnetic circuit. Coils are positioned upon the legs of the energizable magnetic core. In one embodiment, the coils form windings for either a single phase or three phase inductor. In another embodiment, the coils form primary and secondary windings for either a single phase or multi-phase transformer.

The components of the energizable magnetic core may be formed of various materials other than amorphous metals. For example, the energizable magnetic core may be formed of traditional ferromagnetic materials or advanced materials other than amorphous metals. In addition, the magnetic core may take a number of different forms. For example, air gaps may be introduced in the back yoke, legs, cover yoke or and joint between the back yoke, cover yoke or legs to increase the magnetic reluctance in the core. Also, the back yoke, legs, and cover yoke may be formed from laminated strips of material, as ribbon wound material, or formed from a mold. In another disclosed embodiment, both the back yoke and the cover yoke include legs that extend from the yoke and the ends of the legs are positioned adjacent to each other to form the complete core.

Accordingly, an energizable magnetic core is disclosed for use with an inductor or a transformer. The energizable magnetic is core is smaller in size than traditional inductors and transformers and significant cost savings are achieved. Furthermore, advanced materials may be used in the construction of the magnetic core, and inductor or transformer is provided that is highly efficient with little power loss.

DESCRIPTION

Figure 4:
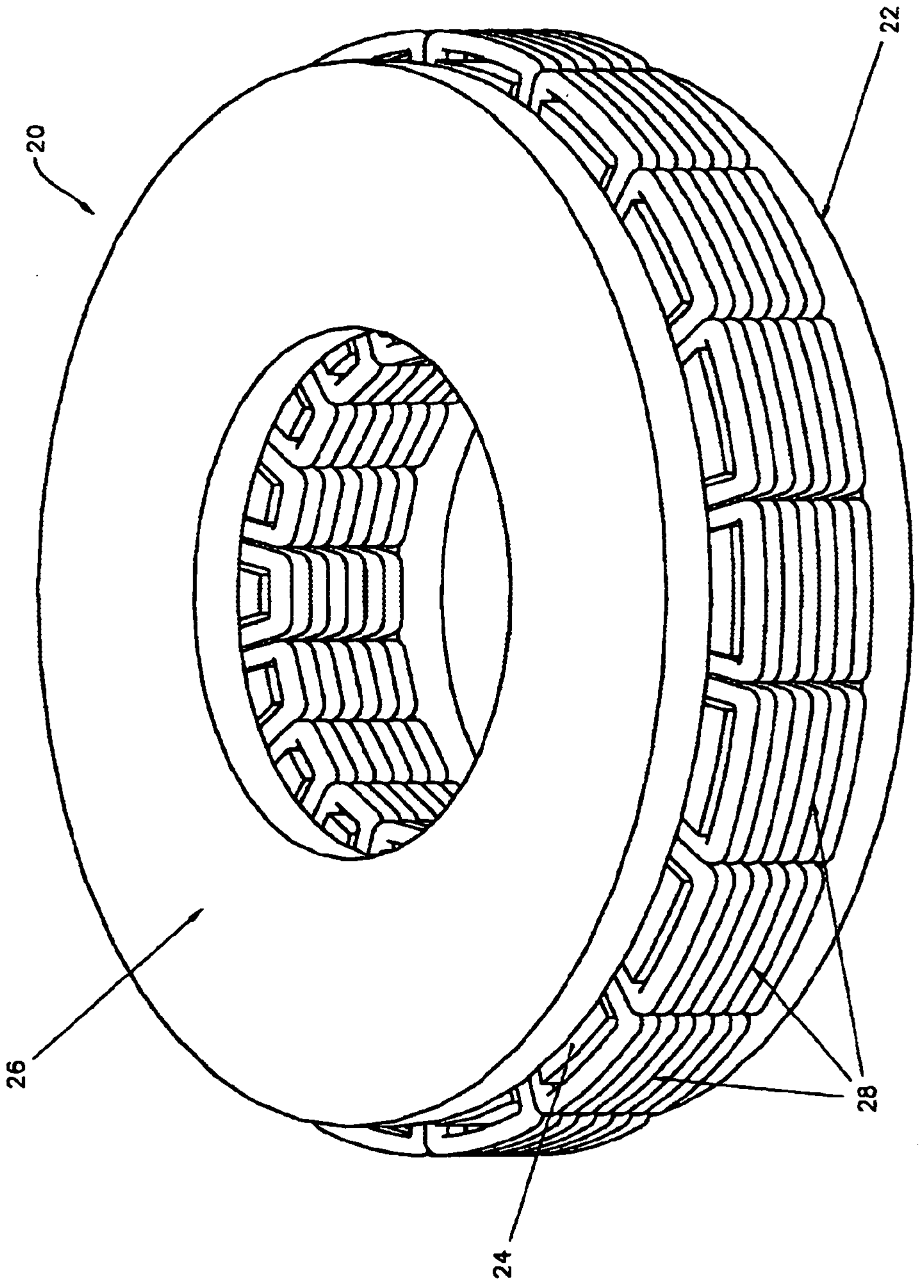
FIG. 4 shows a perspective view of the magnetic core of FIG. 3 with windings positioned upon the legs of the core.

General Description of a Magnetic Core for Stationary Electro-Magnetic Devices An energizable magnetic core is disclosed herein for use with stationary electromagnetic devices such as inductors and transformers. With reference to FIG. 4, a wound magnetic core 20 is shown having at least one winding 28 positioned upon the core. The magnetic core comprises a back yoke 22 and a cover yoke 26 that is positioned generally parallel to the back yoke. A plurality of legs 24 extend between the back yoke 22 and the cover yoke 26. The at least one winding comprises a plurality of individual coils 30 wound around each of the plurality of legs 24. The at least one winding 28 may be arranged upon the core 20 to provide an inductor or a transformer when current flows through the at least one winding.

Figure 1A:
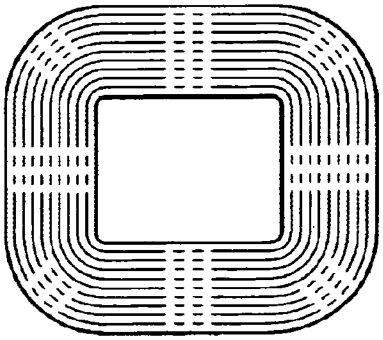
Fig. 1A Prior Art
FIGS. 1A–1D show various exemplary prior art shapes for transformer and inductor cores
Figure 1B:
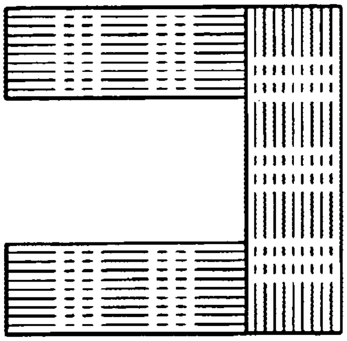
Fig. 1B Prior Art
Figure 1C:
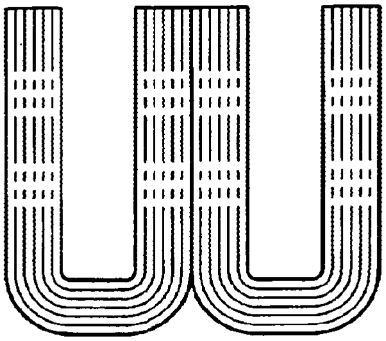
Fig. 1C Prior Art
Figure 1D:
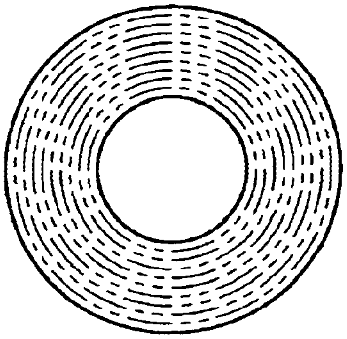
Fig. 1D Prior Art
Figure 2:
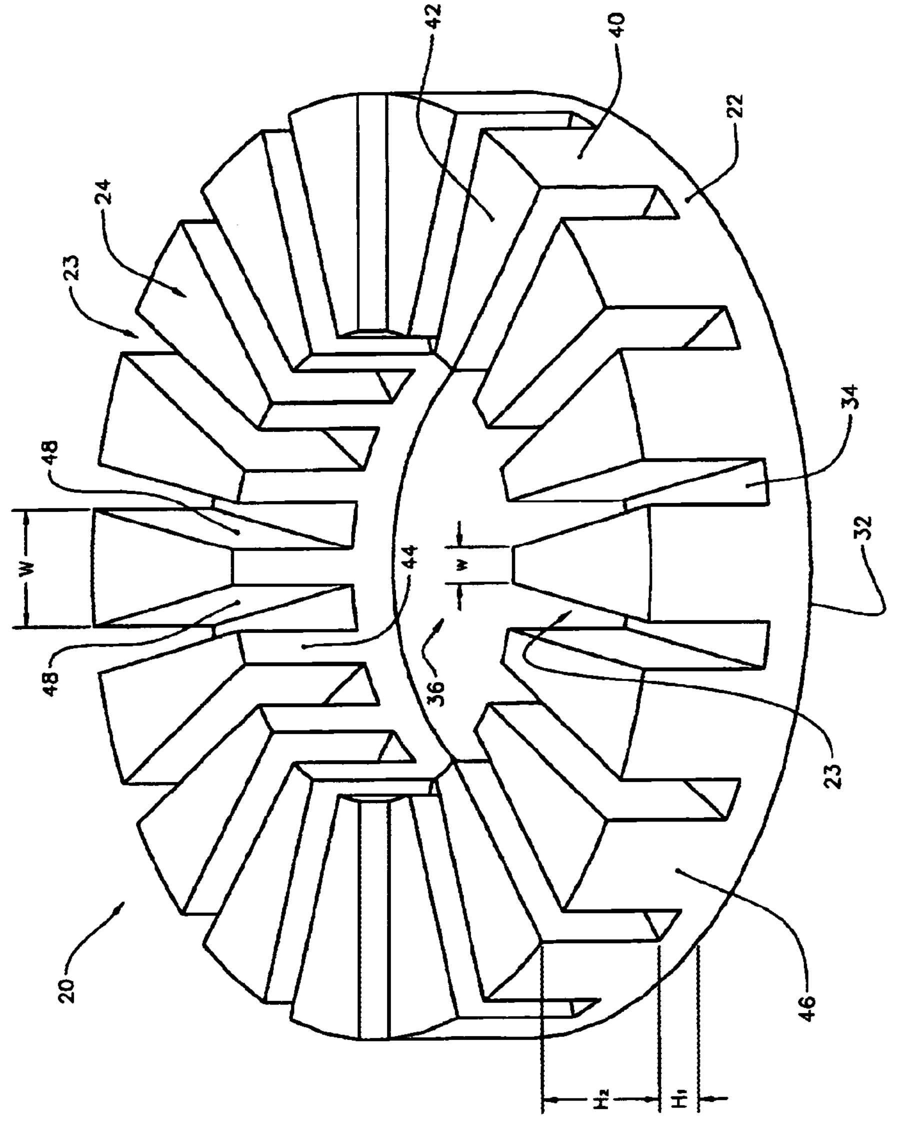
FIG. 2 shows a perspective view of an energizable magnetic core for an inductor or transformer, including the back yoke and legs of the magnetic core.

The back yoke 22 is formed from an energizable soft magnetic material. For example, the back yoke may be made from a ferro-magnetic material or other material having a high magnetic permeability. In one embodiment, the back yoke is made of amorphous metal or other advanced magnetic materials (as defined subsequently herein). As discussed previously, amorphous metal material is generally produced as a ribbon of material wound in a toroid. The shape of the back yoke allows it to be conveniently formed from such amorphous metal in the form of a ribbon wound toroid. As shown in FIG. 2, the back yoke 22 is generally plate-like, having a outer face 32 and an inner face 34 and defining an interior cavity 36. The back yoke 22 forms a complete loop and, because of its high permeability, it is designed to provide a magnetic circuit that retains magnetic flux. The word "loop", as used herein refers to a circuitous arrangement of magnetic material capable of providing a magnetic circuit. In one embodiment, the loop provided by the back yoke may be broken in places (e.g., air gaps may be found in the back yoke), and reluctance thereby added to the magnetic circuit. However, even in this situation, the loop provided by the back yoke 22 is circuitous such that it provides a magnetic circuit. The back yoke 22 may also be referred to as a "back plate" or a "back iron".

Figures 16, 16A, 16B, 16C, 16D, 16E, 16F, 16G, 16H:
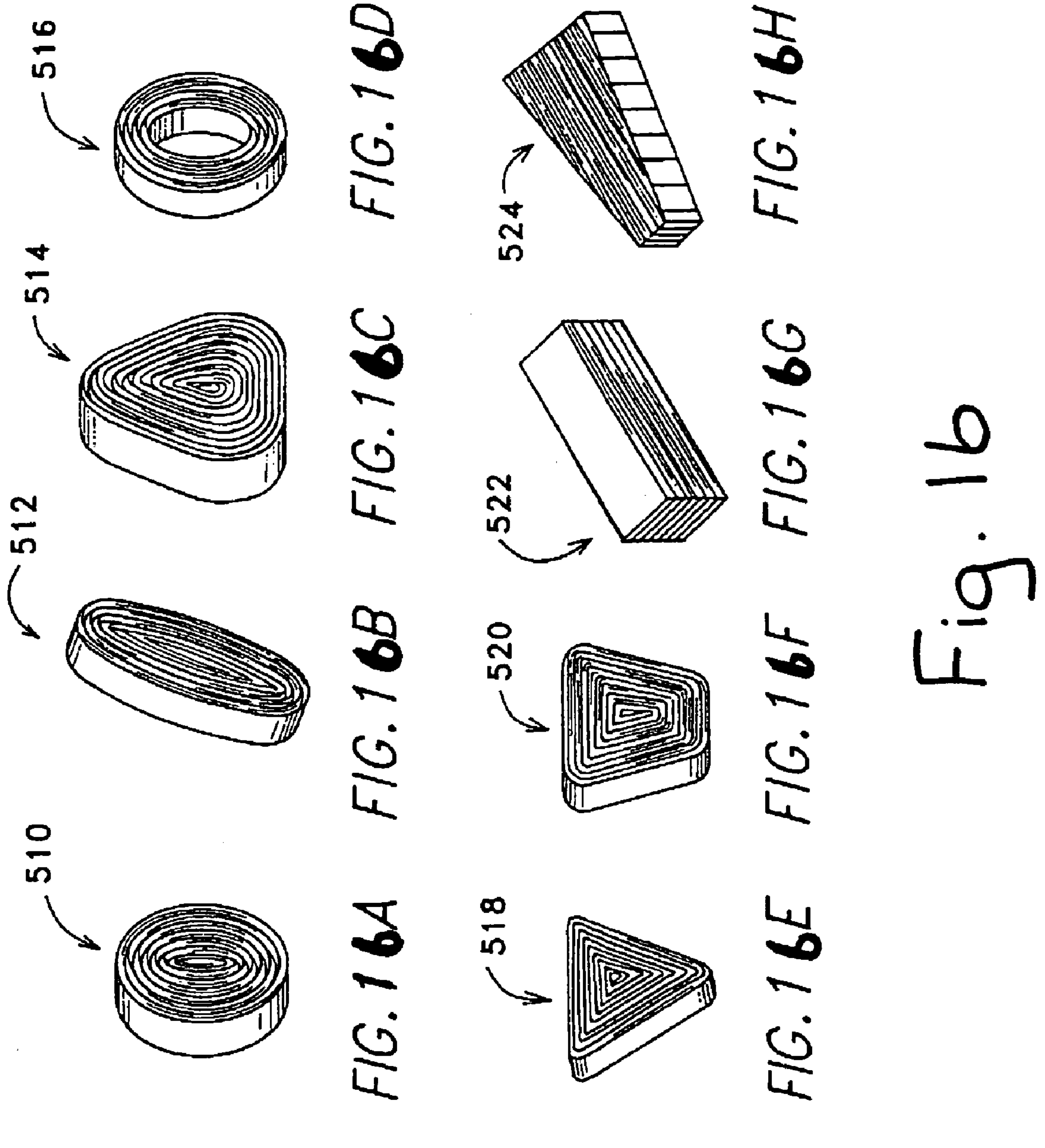
FIG. 16 shows several exemplary legs for use with the magnetic core of FIG. 4.

With continued reference to FIG. 2, a plurality of legs 24 extend from the inner face 34 of the back yoke. These legs 24 may also be referred to herein as "teeth". Slots 23 are located between each of the plurality of legs 24. The legs 24 are generally pie shaped and each leg 24 includes a first end 40 and a second end 42. The first end 40 of each leg 24 is adjacent to the back yoke 22 and the second end 42 is generally removed from the back yoke. In one embodiment, the back yoke and legs are integral and unitary in construction. In another embodiment, the back yoke and legs are formed from separate pieces and joined together using adhesives, welding, clamping or other methods of joining known in the art. In yet another embodiment, a small air gap may be provided between the back yoke and legs that extend from the back yoke. Each leg also includes an interior circumferential side 44, an exterior circumferential side 46, and two radial sides 48. Although pie shaped legs have been disclosed herein, any number of different shaped legs are possible. Several examples of different shaped legs are shown in FIG. 16. For example, as shown in FIGS. 16A–16F, the legs may be of various shapes manufactured by winding amorphous metal ribbon into a toroidal form of the shape. Also, as shown in FIGS. 16G and H, the legs may be individually manufactured from laminate strips of ferro-magnetic material, amorphous metal or other advanced materials. As mentioned previously, these individually manufactured legs are positioned adjacent to the inner face 34 of the back yoke 22 when the core 20 is manufactured.

Figure 3:
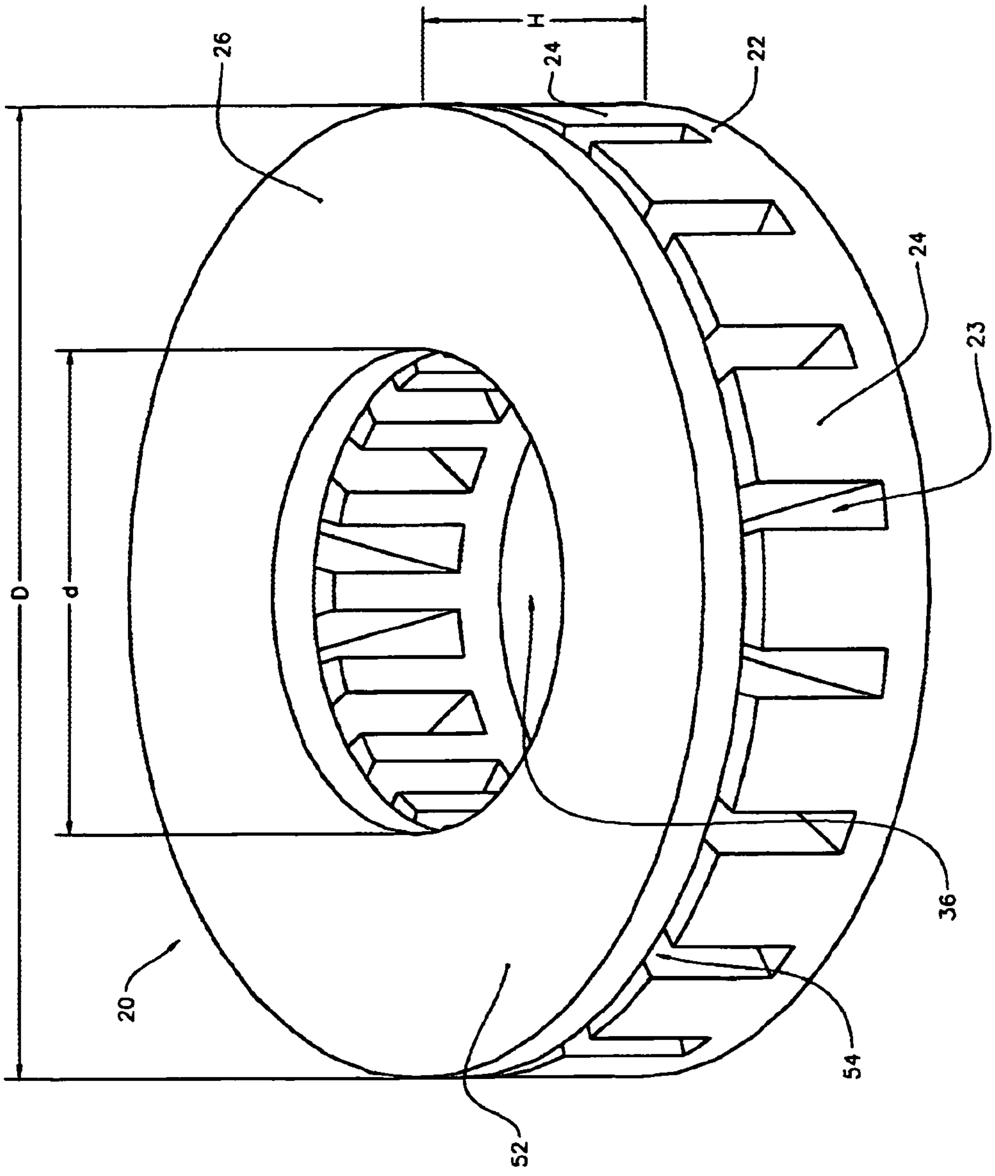
FIG. 3 shows a perspective view of the magnetic core of FIG. 2 including a cover yoke.

With reference now to FIG. 3, a cover yoke 26 (which may also be referred to herein as a "bridge", "cover iron" or "cover plate") is positioned adjacent to the second end 42 of each of the plurality of legs 24, such that the cover yoke 26 covers the second end of each of the plurality of legs. The cover yoke 26 may physically touch and be joined to the second end 42 of each of the plurality of legs 24, or a small air gap may be introduced between the cover yoke 26 and the second end 42 of each of the plurality of legs 24. For example, an air gap of 0.001 inches or less may be used to add reluctance to the magnetic core. Like the back yoke 22, the cover yoke 26 is plate-like and includes and outer face 52, and inner face 54 and defines an interior cavity 36. The faces of the cover yoke 26 are generally parallel to the faces of the back yoke 22. Also, the cover yoke 26 is coaxial with the back yoke 22. Like the back yoke 22, the cover yoke 26 is also formed of an energizable soft magnetic material such as a ferro-magnetic material, advance magnetic materials or other material having a high permeability. In one embodiment, the cover yoke 26 is conveniently formed from amorphous metal in the form of a ribbon wound toroid. The cover yoke 26 forms a complete loop and, because of its high permeability, it is designed to provide a magnetic circuit that retains magnetic flux. In one embodiment, the loop provided by the back yoke may be broken in places (e.g., air gaps may be found in the back yoke), and reluctance thereby added to the magnetic circuit.

FIG. 4 shows the magnetic core 20 with one or more windings 28 positioned upon the legs 24 of the core. The windings 28 include one or more individual coils wound around each leg of the core. Depending upon the arrangement of these coils and the connections between the coils, the magnetic core and winding combination cause the electric device to serve as a transformer or an inductor. Furthermore, the device is easily adapted to serve as a single phase or multi-phase transformer or inductor.

Figure 5:
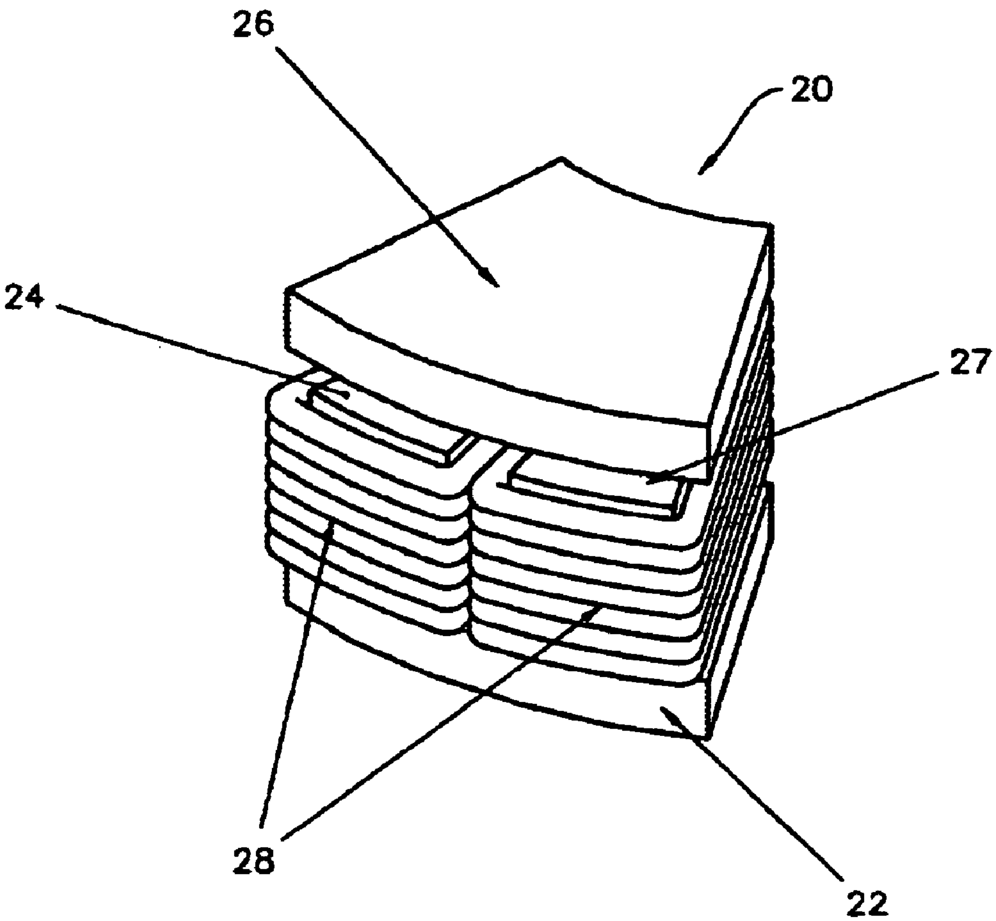
FIG. 5 shows a perspective view of a portion of the magnetic core of FIG. 4 with single phase inductor windings positioned upon the teeth.

As a first example, FIG. 5 shows two wound legs of the magnetic core 20 of FIG. 4 when the device is used as a single phase inductor. In this embodiment, a single phase winding is provided on the core 20 with multiple coils. The coil wound on each leg is connected in series or parallel with the coils on the adjacent legs. Series or parallel connection of the coils is primarily a design choice. When current flows through the winding, energy is stored in the electric device in the form of the magnetic field retained by the core 20. Accordingly, the device acts as an inductor. The overall inductance provided by the device may be adjusted by changing the air gap 27 between the cover yoke 26 and the legs 24.

Figure 6:
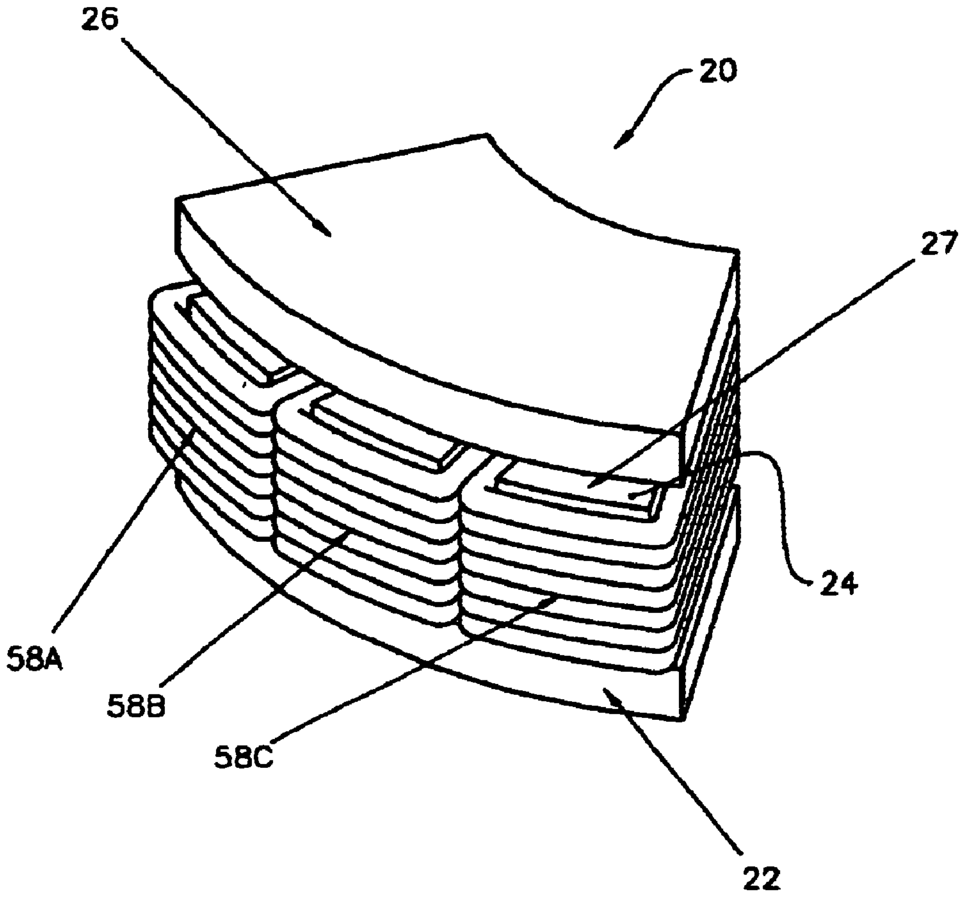
FIG. 6 shows a perspective view of a portion of the magnetic core of FIG. 4 with three phase inductor windings positioned upon the teeth.

As a second example, FIG. 6 shows three wound legs of the magnetic core 20 of FIG. 4 when the device is used as a three phase inductor. In this embodiment, three separate phase windings 58A, 58B, 58C are provided on the core with multiple coils. Each coil carries a different phase than its two adjacent coils, and every third coil carries the same phase. Therefore, assuming the core 22 of FIG. 4 includes eighteen teeth, six of the teeth would be wound with coils 58A carrying phase A, six of the teeth would be wound with coils 58B carrying phase B, and six of the teeth would be wound with coils 58C carrying phase C. Again, when current flows through the windings, energy is stored in the electric device in the form of the magnetic field retained by the core 20. Accordingly, the device acts as a three-phase inductor.

Figure 7:
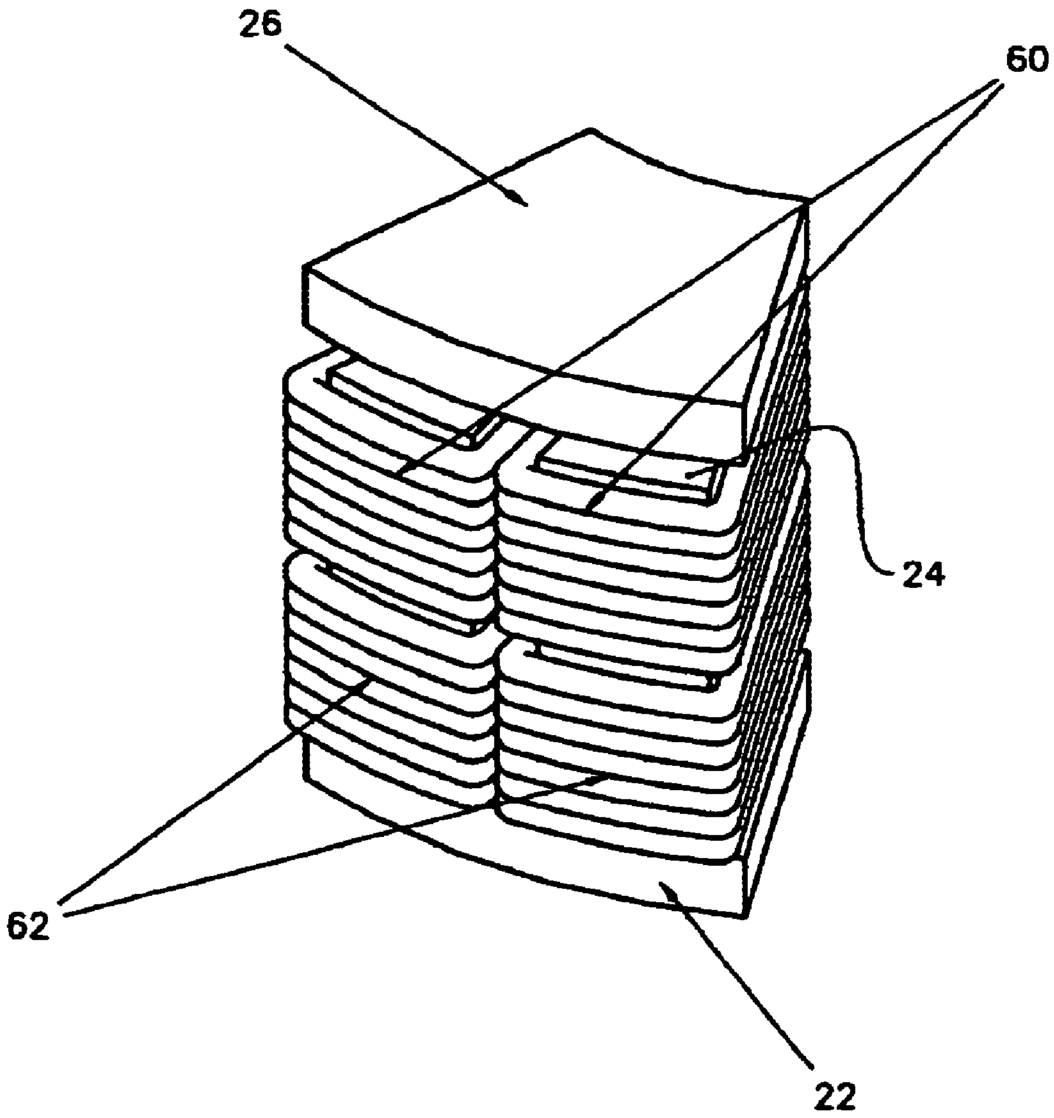
FIG. 7 shows a perspective view of a portion of the magnetic core of FIG. 4 with single phase transformer windings positioned upon the teeth.

A third example of an electric device that may be provided using the magnetic core of FIG. 3 is shown in FIG. 7, where two legs 24 of the magnetic core of FIG. 3 are shown. In this example, the device is a single phase transformer. Accordingly, a primary winding 60 and a secondary winding 62 are provided on each leg 24 of the magnetic core. Each coil that comprises part of the primary winding is connected in series or parallel to the coil on the adjacent leg that also comprises part of the primary winding. Whether the coils are connected in series or parallel is a matter of design choice. Likewise, each coil that comprises part of the secondary winding is connected in series or parallel to the coil on the adjacent leg that also comprises part of the secondary winding. The primary and secondary coils may be separated on each leg, as shown, or may be inter-wound on each leg. When current flows through the primary winding energy is stored in the electric device in the form of a magnetic field retained by the core. Of course, the secondary winding also experiences this magnetic field retained by the core, and an electric current is induced in the secondary winding. As is known to those of skill in the art, the amount of current induced in the secondary winding is dependent upon the number of turns of the primary and secondary windings. Therefore, the design of the transformer, including the number of turns of the primary and secondary windings may be changed depending upon the desired performance characteristics of the transformer.

Figure 8:
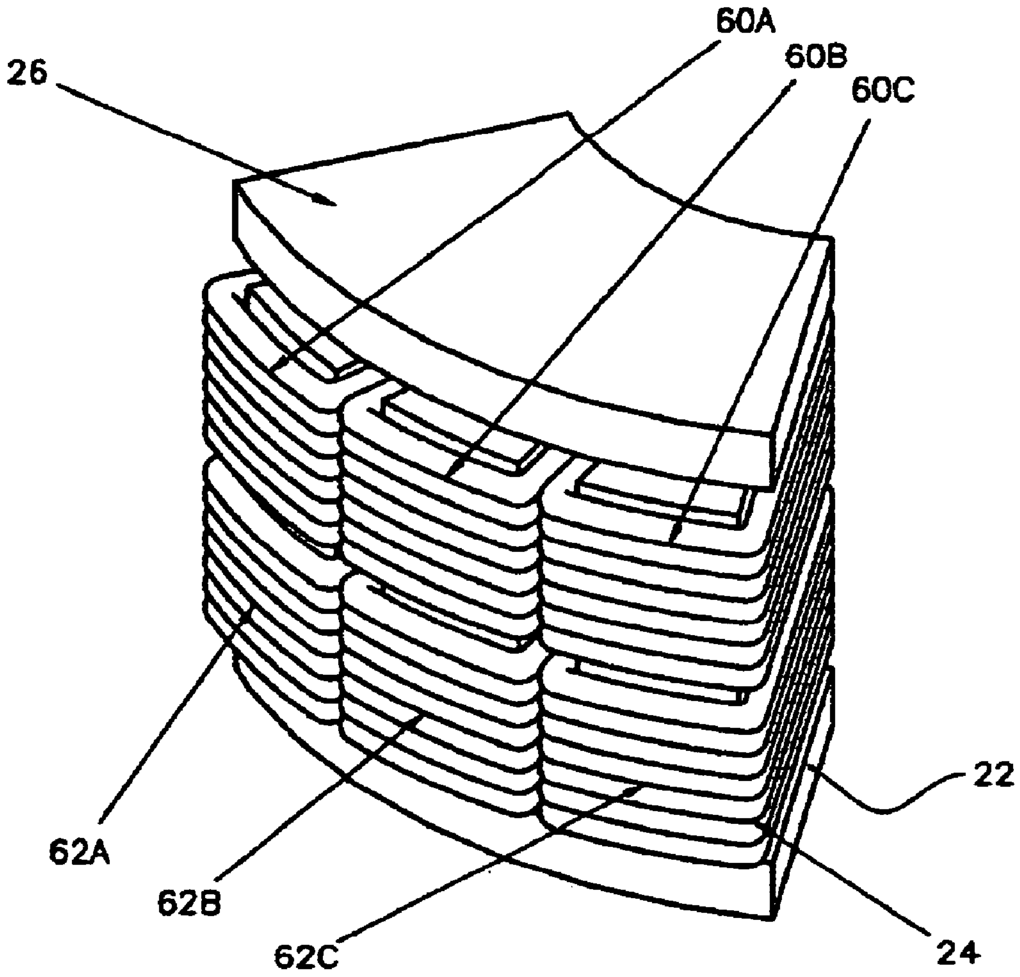
FIG. 8 shows a perspective view of a portion of the magnetic core of FIG. 4 with three phase transformer windings positioned upon the teeth.

A fourth example of an electric device using the magnetic core of FIG. 3 is shown in FIG. 8, which shows a three phase transformer. In this embodiment, three separate phase windings are provided on the core with multiple coils. Each coil carries a different phase than its two adjacent coils, and every third coil carries the same phase. Therefore, assuming the core 22 of FIG. 4 includes eighteen teeth, six of the teeth would be wound with coils carrying phase A, six of the teeth would be wound with coils carrying phase B, and six of the teeth would be wound with coils carrying phase C. Again, when current flows through the windings 60A, 60B and 60C, energy is stored in the electric device in the form of the magnetic field retained by the core 20. The secondary windings 62A, 62B and 62C also experience this magnetic field retained by the core, and an electric current is induced in the secondary windings. Of course, the design of the transformer, including the number of turns of the primary and secondary windings may be changed depending upon the desired performance characteristics of the transformer. Accordingly, the device acts as a three-phase transformer.

It will be appreciated by those of skill in the art that the magnetic core disclosed herein allows transformers and inductors to be produced at a size that is significantly smaller than prior art inductors and transformers. Generally, the cross-sectional area of the legs of a transformer or inductor core must be approximately the same as the cross-sectional area of the yoke connecting the legs. Using the analogy of a magnetic circuit, the reason for this is apparent for single phase device. In particular, for an efficient device, the magnetic flux retained by the core should be free to flow between the yoke to the legs with minimal reluctance. If the cross-sectional size of the yoke is significantly smaller than the cross-sectional size of the legs, significant reluctance will be experienced by the device, decreasing the efficiency of the device. The yokes of the magnetic core disclosed herein have significantly smaller cross-sectional areas than prior art yokes. The reason for this is that there are a plurality of relatively thin legs in each device that are joined by the yokes. Accordingly, the yokes of the magnetic core disclosed herein are proportional in size to the legs, and significantly smaller than prior art yokes. Accordingly, the size of the electric device disclosed herein is significantly smaller than prior art device without sacrificing efficiency.

For three-phase devices, the rationale for equivalent cross-sectional areas of legs and yokes may be explained slightly differently than the rationale provided above with respect to single phase devices. In a three phase device, the currents flowing in each phase winding are time-dependent and typically sinusoidal. Thus the magnetic lines of flux are time-dependent and similarly sinusoidal. In a typical prior art E-shaped core, there is a point in time when the winding current and flux in the center leg is at 100%. During this time, the flux in the external legs is each at 50%. At this point in time, both yokes connecting the legs could in fact be exactly one-half of the cross-section area of the center leg, as the yokes are only carrying fifty percent 50% of the leg flux in each of two opposite directions. However, when either of the external legs is at 100% winding current and flux, then the one-half cross sectional situation is not valid. This is because 100% of the flux flows in a single direction, with 50% of the flux flowing from the external to the center leg, and 50% flowing from the external to the far external leg. For this reason, in E-core devices, the yokes typically have exactly the same cross section as the legs. The electromagnetic core presented herein is different. In particular, because of the introduction of a loop backiron, there is not any point in time when 100% of the flux from any leg must travel in a single direction. Whenever any leg is selected for 100% flux, the flux will always travel in two opposite directions, to the two adjacent legs. Thus an advantage of the core disclosed herein is that the backiron and cover iron provide one-half cross-sectional area yokes when compared to typical prior art yokes.

As can be clearly seen in FIG. 3, the core includes an inside circumference that defines an inner diameter (d) and outer circumference that defines and outer diameter (D) of the core 20. The inside and outside circumferences are not continuous on the slotted portion. Instead, the inside circumference that traverses the slots has gaps where the slots are located. These slots are designed to hold inductor or transformer windings. Each of the remaining portions of the core inside circumference (i.e., the individual extensions from the backiron 22) form the legs 24. FIG. 2 shows the interior width (w) and exterior width (W) of the teeth 21 as well as the height (h2) of the teeth. FIG. 2 also shows the height (h1) of the back yoke 22, which is generally the same height as that of the cover yoke. The overall height of the core is shown in FIG. 3. As mentioned in the preceding paragraph, the height of the back yoke 22 and cover yoke 24 are close to the width of the teeth. Of course, in the embodiment shown in FIG. 2, the legs 24 vary in width from the inner circumference to the outer circumference of the core. Therefore the height (h1) of the yoke 22 or 26 is typically greater than the inner width of the leg (w), and less than outer width of the leg (W). In one embodiment, the narrowest part of a leg (w) is not less than 0.100 inch. The area that is removed when the back iron is slotted can be filled with potting and/or varnish compounds, or thin organic insulation materials, along with the appropriate winding, as is known in the art.

Advanced Low-Loss Materials

The introduction of amorphous, nanocrystalline, optimized Si—Fe alloy, grain-oriented Fe-based, or non-grain-oriented Fe-based material into the core enables the device's frequency to be increased above 300 Hz with only a relatively small increase in core loss, as compared to the large increase exhibited in conventional devices using conventional magnetic core materials, such as Si—Fe alloys. The use of these low-loss materials in the magnetic core allows the development of the high-frequency electric devices capable of efficient operation and low losses.

Amorphous Metals

Amorphous metals are also known as metallic glasses and exist in many different compositions. Metallic glasses are formed from alloys that can be quickly quenched without crystallisation. Amorphous metal differs from other metals in that the material is very thin, i.e., 2 mils (two thousandths of an inch) or less in thickness and extremely brittle, thus making the material difficult to handle. A suitable amorphous material applicable to the present invention is Metglas® 2605SA1, sold by Metglas Solutions which is owned by Hitachi Metals America, Ltd. (see http://www.metglas-.com/products/page5 1 2 4. htm for information on Metglas 2605SA1).

Amorphous metals have a number of recognized disadvantages relative to conventional Si—Fe alloys. The amorphous metals exhibit a lower saturation flux density than conventional Si—Fe alloys. The lower flux density yields an electric device with lower power densities (according to the conventional methods). Another disadvantage of amorphous metals is that they possess a lower coefficient of thermal transfer than for the conventional Si—Fe alloys. As the coefficient of thermal transfer determines how readily heat can be conducted to a cool location, a lower value of thermal coefficient could result in greater problems for conducting away waste heat (due to core losses) when cooling the electric device. Conventional Si—Fe alloys exhibit a lower coefficient of magnetostriction than amorphous metals. A material with a lower coefficient of magnetostriction undergoes smaller dimensional change under the influence of a magnet field, which in turn would result in a quieter device. Additionally, the amorphous metal is more difficult to process, i.e., be stamped, drilled, or welded, in a cost effective manner than is the case for conventional Si—Fe.

In spite of these disadvantages of amorphous materials, such amorphous metals can be used to successfully provide a electric device such as an inductor or transformer that operates at high frequencies (i.e., frequencies greater than about 300 Hz). This is accomplished through exploiting the advantageous qualities of the amorphous metals over the conventional Si—Fe alloys. The amorphous metals exhibit much lower hysteresis losses at high frequencies, which results in much lower core losses. The much lower electric conductivity of the amorphous metals, which results in lower amplitude of eddy currents, also leads to lower core losses. Additionally, the ribbon or sheet thickness for amorphous metals is typically much smaller than for conventional Si—Fe alloys, which also lowers the eddy currents and the core losses. Use of amorphous metals can successfully provide an electric device that operates at high frequencies through compensating for the disadvantages of the amorphous metals, while exploiting the advantageous qualities of the amorphous metal, such as the lower core loss.

Silicon-Iron Alloys

As used herein, conventional Si—Fe refers to silicon-iron alloys with a silicon content of about 3.5% or less of silicon by weight. The 3.5 weight percentage limit of silicon is imposed by the industry due to the poor metalworking material properties of Si—Fe alloys with higher silicon contents. The core losses of the conventional Si—Fe alloy grades resulting from operation at a magnetic field with frequencies greater than about 300 Hz are roughly ten times that of amorphous metal, causing the conventional Si—Fe material to heat to the point where a conventional device cannot be cooled by any acceptable means. However, some grades of silicon-iron alloys, herein referred to as optimized Si—Fe, would be directly applicable to producing a high-frequency device.

Optimized Si—Fe alloys are defined as silicon-iron alloy grades comprising greater than 3.5% of silicon by weight. The preferred optimized Si—Fe alloys comprises about 6.5%±1% of silicon by weight. The objective of the optimization process is to obtain an alloy with a silicon content that minimizes the core losses. These optimized Si—Fe alloy grades are characterized by core losses and magnetic saturation similar to those of amorphous metal. A disadvantage of optimized Si—Fe alloys is that they are somewhat brittle, and most conventional metalworking technologies have not proven feasible in manipulating the material. However, the brittleness and workability issues surrounding optimized Si—Fe are somewhat similar to those of amorphous metal, and the design methodology used for application of amorphous metal is very close to that used for optimized Si—Fe.

Conventional rolling techniques used to make conventional Si—Fe are generally not used to make optimized Si—Fe. However, other techniques known in the industry are used to make optimized Si—Fe. For example, milled optimized Si—Fe alloys can be made by milling techniques known in the art. However, it has not proven acceptable for mass production. Optimized Si—Fe alloys is also being manufactured through a proprietary vacuum vapor deposition process by JFE Steel Corporation, Japan. A composition of iron or silicon-iron is coated with silicon vapor under vacuum conditions, and the silicon is allowed to migrate into the material. The vacuum vapor deposition process is controlled to achieve the optimum content of 6.5% of Si by weight. While optimized Si—Fe alloy derived from vapor deposition is more brittle than conventional SiFe, it is less brittle than the milled optimized Si—Fe. The optimized Si—Fe is commercially available from JFE as "Super E-Core," and is sold as a high-performance 6.5%-silicon magnetic steel sheet.

Nanocrystalline Metals

Nanocrystalline materials are polycrystalline materials with grain sizes up to about 100 nanometers. The attributes of nanocrystalline metals as compared to conventional course grained metals include increased strength and hardness, enhanced diffusivity, improved ductility and toughness, reduced density, reduced modulus, higher electrical resistance, increased specific heat, higher thermal expansion coefficients, lower thermal conductivity, superior soft magnetic properties. Preferably, the nanocrystalline metal is an iron-based material. However, the nanocrystalline metal could also be based on other ferromagnetic materials, such as cobalt or nickel. An exemplary nanocrystalline metal with low-loss properties is Hitachi's Finemet FT-3M. Another exemplary nanocrystalline metal with low-loss properties is Vitroperm 500 Z available from Vacuumschmelze GMBH & Co. of Germany.

Grain-oriented and Non-Grain-Oriented Metals

The grain-oriented Fe-based material results from mechanical processing of Fe-based material by methods known in the art. The grain-orientation refers to the physical alignment of the intrinsic material properties during the rolling processes to produce thinner and thinner metal, such that the grains of the resulting volume of material possess a preferential direction of magnetization. The magnetization of the grains and magnetic domains are oriented in the direction of the rolling process. This domain orientation allows the magnetic field to be more readily reversible in the direction of orientation, yielding lower core losses in that preferred direction. However, the core losses increase in the direction orthogonal to the preferred orientation, and could prove to be a disadvantage in electric device applications.

Non-grain-oriented Fe-based materials have no preferred direction of magnetic domain alignment. The non-grain-oriented Fe-based material is not amorphous, in that is possesses some amount of crystallinity. Presently available conventional silicon steel has some crystal structure, because it is cooled slowly, which results in some crystallisation, and then thinned. However, unlike grain-oriented Fe-based materials such as conventional silicon steel, the non-grain-oriented Fe-based material has a more isotropic magnetization. Preferably, the non-grain-oriented Fe-based materials applicable to the present invention would have thicknesses less than 5 mils.

Defining Advanced Low Loss Materials

The core loss of soft magnetic materials can generally be expressed by the following modified Steinmetz equation:

$$L=a\cdot f\cdot B^{b}+c\cdot f^{d}\cdot B^{e}, \text{ where}$$

L is the loss in W/kg, f is the frequency in KHz,

B is the magnetic flux density in peak Tesla, and a, b, c, and d and e are all loss coefficients unique to the soft magnetic material.

Each of the above loss coefficients a, b, c, d and e, can generally be obtained from the manufacturer of a given soft magnetic material. As used herein, the term "advanced low loss materials" includes those materials characterized by a core loss less than "L" where L is given by the formula $L=12\cdot f\cdot B^{1.5}+30\cdot f^{2.3}\cdot B^{2.3}$, where L is the loss in W/kg, f is the frequency in KHz, and B is the magnetic flux density in peak Tesla.

FIGS. 10–15 provide charts showing the core loss (as defined by the equation $L=a\cdot f\cdot B^{b}+c\cdot f^{d}\cdot B^{e}$) of various soft magnetic materials versus either the magnetic flux density or the frequency, at various frequencies ranging from 0.4 kHz to 2.0 kHz and various magnetic flux densities ranging from 0.5 Tesla to 1.5 Tesla. The loss coefficients for each of the materials shown in FIGS. 10–15 is provided in table 1 below:

TABLE 1

LOSS COEFFICIENTS

| Loss Coeff | Isotropic Powder, Hoeganes Somalloy 500, +.05% Kenolube | Typical 26 gauge M19, non-grain-oriented | Grain-oriented. 0.014" Orthosil M6 29 gauge El 1/2, Thomas & Skinner | "Advanced Materials" Defined Loss Limit |
|---|---|---|---|---|
| A | 40.27 | 11.39 | 38.13 | 12.00 |
| B | 2.15 | 1.62 | 2.37 | 1.50 |
| C | 141.24 | 112.43 | 14.19 | 30.00 |
| D | 1.15 | 1.72 | 3.66 | 2.30 |
| E | 1.46 | 2.01 | 2.14 | 2.30 |

| Loss Coeff | Vapor Deposited 6.5% Si, JFE Super E, 0.10 mm | Amorphous, Metglas 2605SA1, advertised literature | Nanocrystalline, VAC Vitroperm 500 Z | NanoCrystalline, Hitachi Finemet FT-3M |
|---|---|---|---|---|
| A | 10.77 | 0 | 0 | 0.00 |
| B | 1.85 | 0 | 0 | 0 |
| C | 7.83 | 6.5 | 0.84 | 1.05 |
| D | 1.93 | 1.51 | 1.5 | 1.15 |
| E | 1.85 | 1.74 | 1 | 2.32 |

Each of the above materials is a soft magnetic material comprised primarily of an iron based alloy. Each of the coefficients noted in the tables above are available from the manufacturers of the materials or may be derived from the material specifications available from the manufacturers of the materials, and the coefficients are generally included on the spec sheets for the materials. To this end, each manufacturer of soft magnetic materials will typically participate in industry standard ASTM testing procedures that produce the material specifications from which the coefficients for the Steinmetz equations may be derived.

As can be seen in FIGS. 10–15, a threshold line segment is plotted to show the loss equation that defines the loss threshold for "advanced low loss materials". Materials having a loss equation plotted above this threshold are not "advanced low loss materials". Materials having a loss equation plotted at or below this threshold are defined herein as "advanced low loss materials", "advanced magnetic materials" or "advanced materials". As can be seen from FIGS. 10–15, the advanced low loss materials include, without limitation, amorphous metals, nanocrystalline alloys, and optimized Si—Fe. In the following paragraphs of disclosure a description of a highly efficient electromagnetic electric device constructed from such advanced low-loss materials is provided. The plots provided in FIGS. 10–15 are shown for frequencies ranging from 0.4 kHz to 2.0 kHz and flux densities ranging from 0.5 Tesla to 1.5 Tesla because these are typical ranges for operation of the electric devices described herein. However, the electric devices described herein are not limited to operation in such ranges.

Manufacture of Electric Device

One method for manufacturing the electric device disclosed herein involves winding a ribbon of advanced low-loss material is into a large toroid to form the back yoke 22 of the core 20. These ribbons are typically 0.10 mm (0.004") or less in thickness. The toroid wound from the ribbon has an inside diameter and an outer diameter when viewed in the axial direction. In one embodiment, the legs are positioned upon the back yoke by machining the back yoke with slots 23 to form a unitary magnetic core (discussed in further detail below). Unfortunately, this method involves some waste material, as material cut away from the toroid to form the slots is scrap. As discussed previously, another method for forming legs on the core is to position smaller toroidal (or other) shapes made from ribbons of advanced low loss material upon the inner face of the back yoke. Examples of such shapes are shown in FIG. 16. These legs formed from smaller shapes of advanced low loss material may be affixed to the back yoke by adhesives, welding, clamping or any other method known in the art. With the legs 24 positioned upon the back yoke 22, the slots 23 are easily accessible and windings may be placed in the slots of the electric device. In particular, individual coils that comprise the windings are wound around each leg of the electric device. Thereafter, the cover yoke 26, which is manufactured in the same manner as the back yoke 22, may be placed upon the electric device. As mentioned previously, the cover yoke may directly contact the legs of the core, or a small air gap may be included between the cover yoke and the legs to introduce a desired reluctance into the core. If the core is used in an inductor, the air gap is carefully adjusted to obtain the correct inductance, as larger air gaps will yield greater inductance. If the core is used in a transformer, the air gap between the teeth and bridge will typically be minimal to reduce the inductance and excitation losses.

Use of advanced materials in construction of the magnetic core disclosed herein provides for lower core losses in the electric devices, particularly as the frequency of the device increases greater than 300 Hz. Amorphous metal has lower thermal conductivity than typical SiFe, making the cooling methodology for the disclosed device made from amorphous metal different than that used for most existing inductors and transformers. In particular, cooling will be easier, since core losses are lower, however the designer may choose to increase the percentage of ohmic losses in an optimization strategy.

As mentioned previously, the core may be comprised of advanced low loss material and is "unitary" in construction in one embodiment. As used herein, a core that is "unitary" in construction is one that is does not require the assembly of two or more subcomponents to complete the core. In addition, the unitary core disclosed herein is also a "uni-body" core. As used herein, the term "uni-body" (or "uni-body") refers to a core that is layered from a thin ribbon of soft magnetic material to form a base shape and material is then removed from the base shape to form the core (e.g., the base shape is slotted to form teeth on the core). Unfortunately, advanced low loss materials tend to be extremely brittle, and making a uni-body core has proven to be difficult. Nevertheless, several companies, including some manufacturers of advanced low loss materials, have manufactured such cores made of advanced low loss materials using various processes, such as wire electro-discharge machining, laser cutting, electrochemical grind, or conventional machining.

Although the cores described herein are uni-body cores of unitary construction, various types of non-unitary and non-uni-body cores are contemplated for use in the electric devices described herein. For example, a "uni-body" core is possible that is subsequently cut into segments, making the resulting core not "unitary". Likewise, a "unitary" core may be formed by molding an advanced material into the form of a magnetic core, including any teeth, but because the core is not wound from a thin ribbon to form a base shape with subsequent removal of material from the base shape, the resulting core would not be "uni-body".

An additional advantage to using advanced materials in the electric devices disclosed herein is that additional design choices are introduced. This is possible because when the devices are comprised of advanced materials, they have lower loss-per-mass associated with the changing magnetic flux. Accordingly substitution of advanced materials for the higher loss materials typically used in the prior art allows for the overall losses to be reduced. These loss units are in watts (W). All electric devices must transfer the waste heat generated by these losses to some other cooler region. Failure to do so results in catastrophic runaway temperature rise of the device. Although liquid cooling is possible, the overwhelming majority of these devices are cooled by air cooling. Furthermore, the overwhelming majority of these devices use the device surface area as the surface through which the transfer of heat takes place. These units are in area, i.e., $cm^2$. A common figure of merit is the loss divided by surface area through which to dissipate this loss, e.g. $W/cm^2$. Given these circumstances, there a number of possibilities that the designer of these devices can take advantage of, with the introduction of advanced material and the subsequent reduced loss-per-mass material. For example, suppose that an original device using higher loss materials has $W/cm^2$ of 0.40, but introducing advanced material results in $W/cm^2$ of 0.20. The designer then has at least the following design choices. A first design choice is to reduce the size of the device, and thus reduce the surface area until the $W/cm^2$ returns to 0.40. With this choice, there is then an improvement by way of reduced cost and smaller package size, for the same performance. A second design choice is to allow an increase to the current flowing in the winding, thus increasing the ohmic and core losses, until the $W/cm^2$ is 0.40. With this choice, the power capacity of the existing device is increased without adding cost and size. A third design choice is to accept the device at the new loss density of 0.20 W/cm$^2$, and rate it to work in less thermally-forgiving environments. A fourth design choice would be to incorporate some combination of the first through the third choices.

Figure 9:
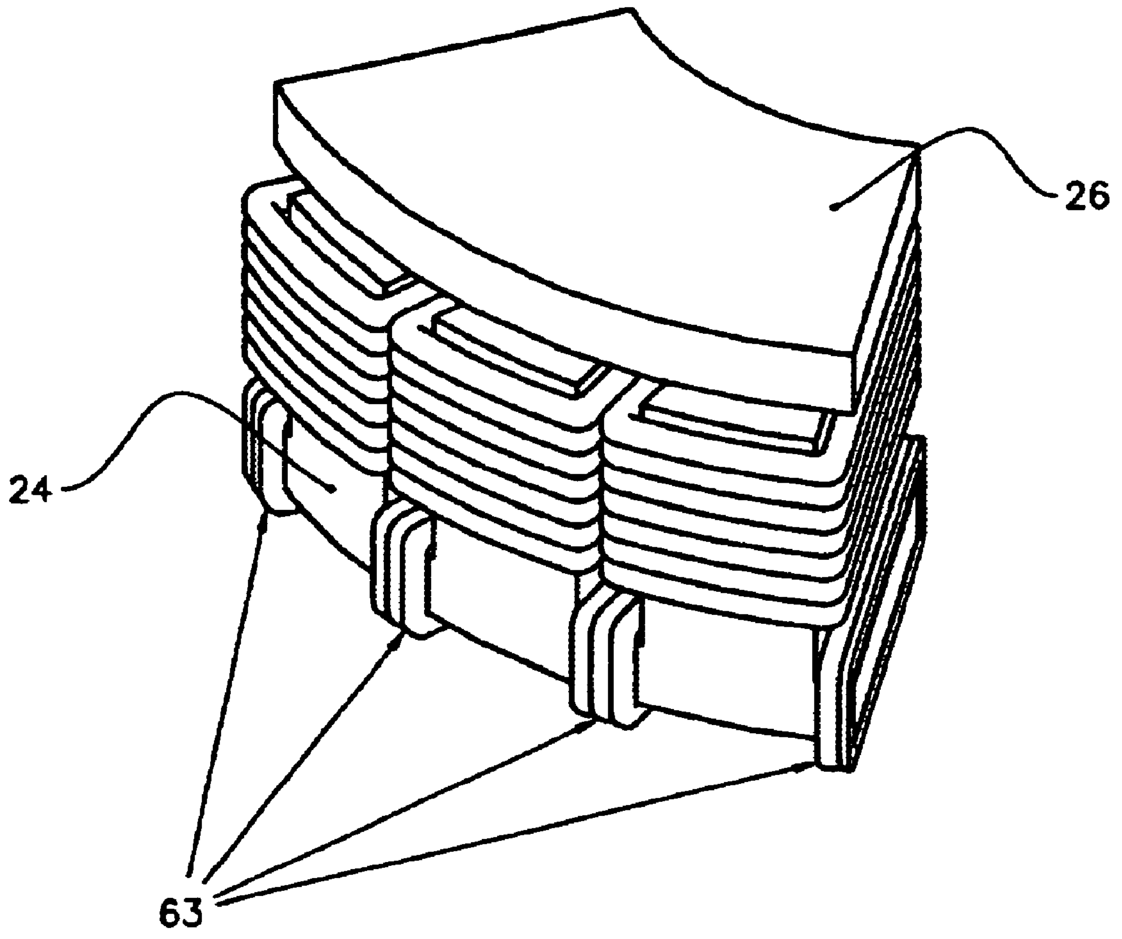
FIG. 9 shows a perspective view of a portion of the magnetic core of FIG. 4 with adjacent coils positioned upon the back yoke.
Figure 10:
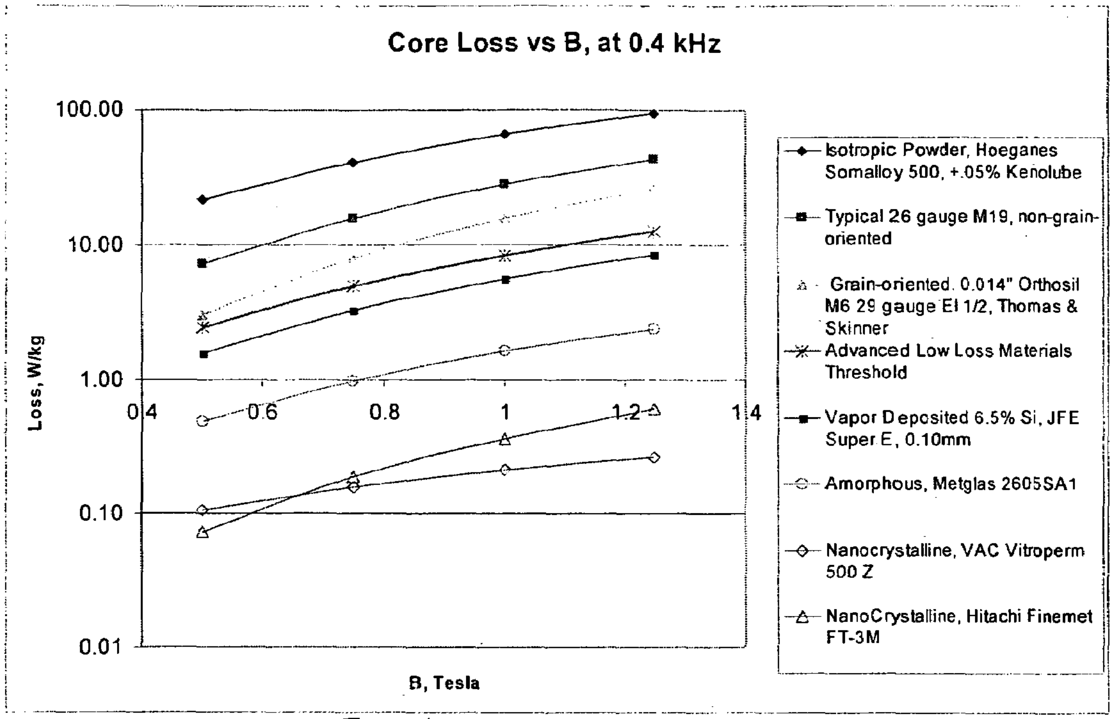
FIG. 10 shows a chart of core loss of various soft magnetic materials versus the magnetic flux density, at 0.4 kHz.
Figure 11:
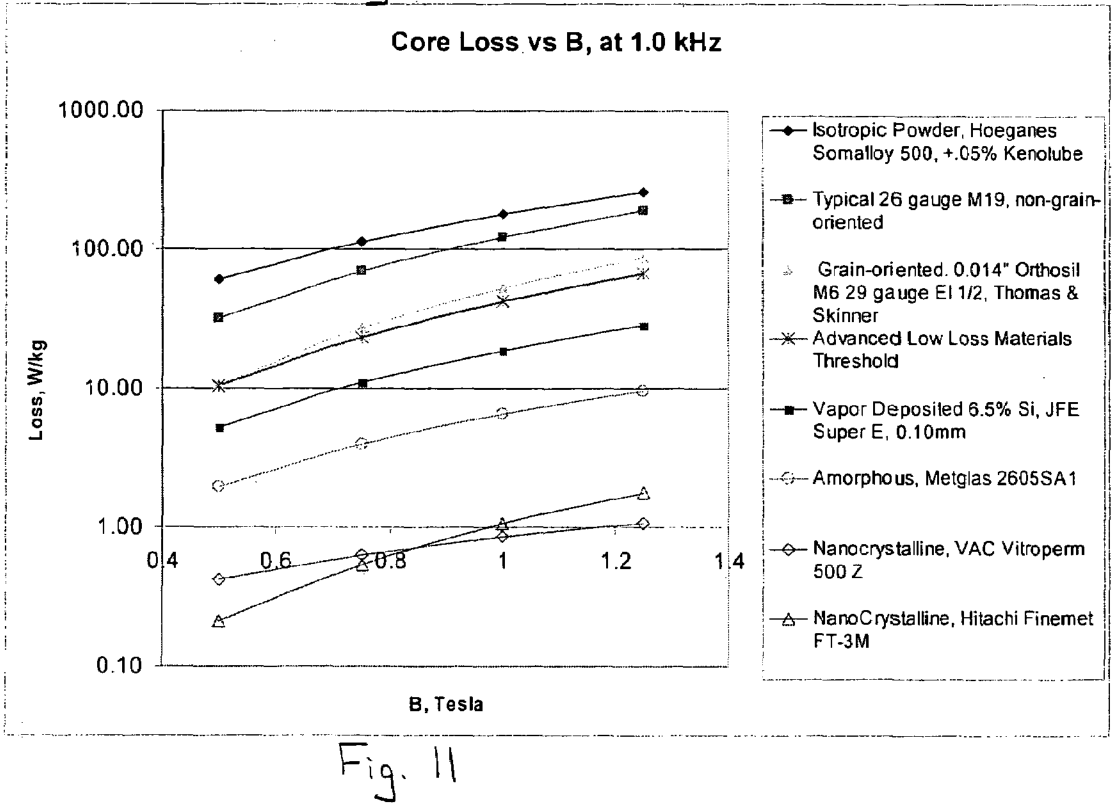
FIG. 11 shows a chart of core loss of various soft magnetic materials versus the magnetic flux density, at 1.0 kHz.
Figure 12:
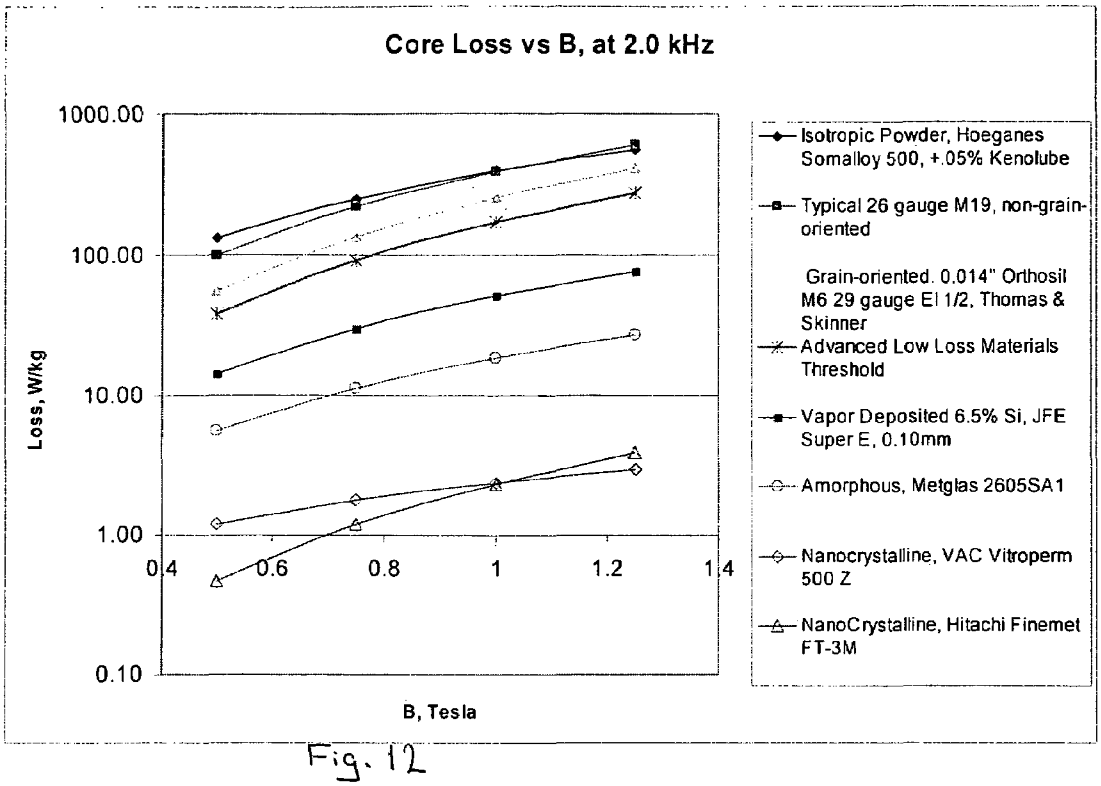
FIG. 12 shows a chart of core loss of various soft magnetic materials versus the magnetic flux density, at 2.0 kHz.
Figure 13:
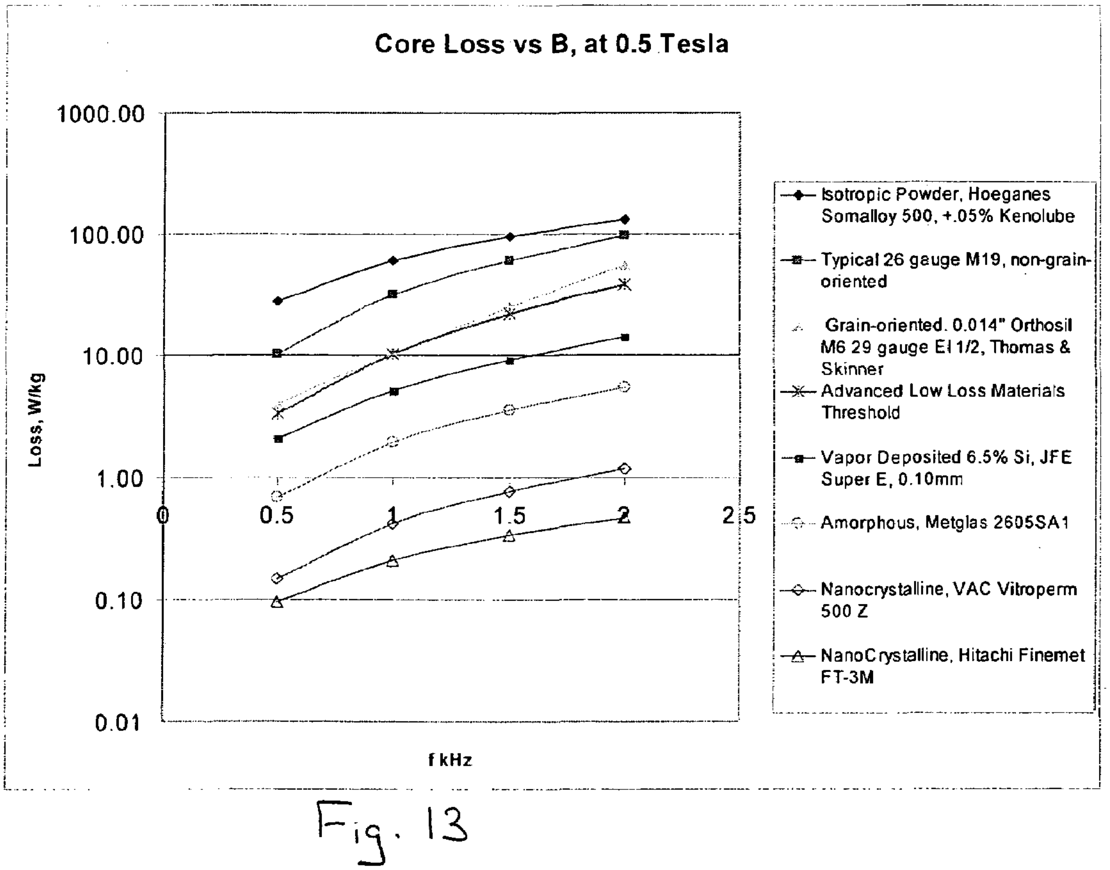
FIG. 13 shows a chart of core loss of various soft magnetic materials versus frequency, at 0.5 tesla.
Figure 14:
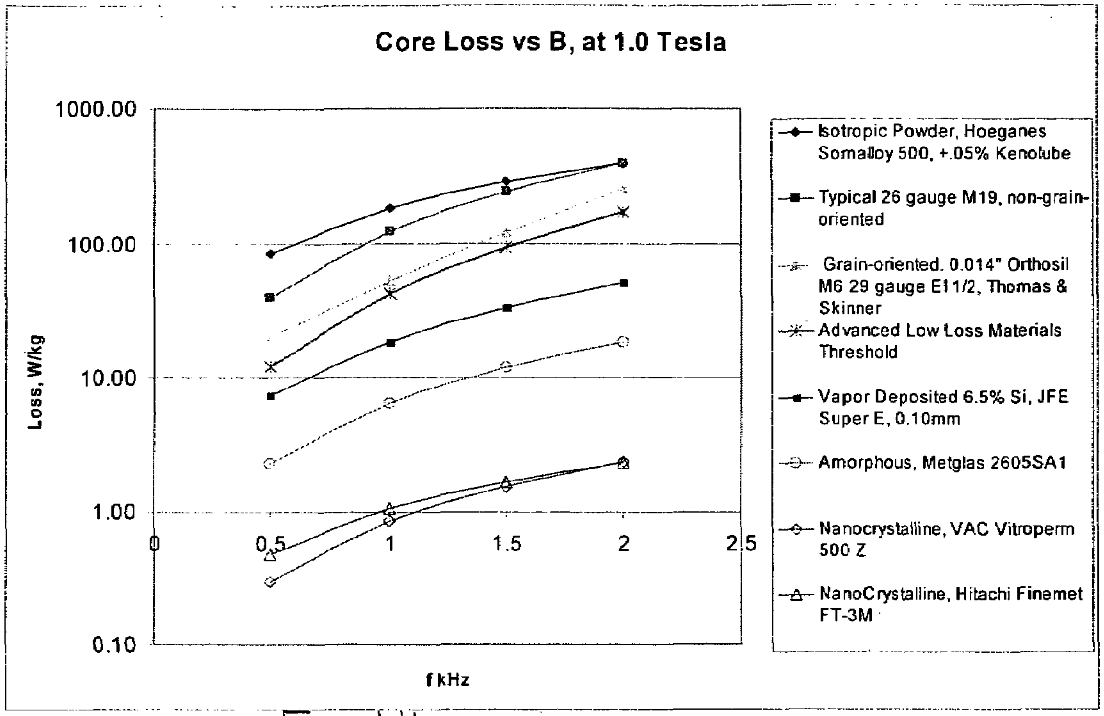
FIG. 14 shows a chart of core loss of various soft magnetic materials versus frequency, at 1.0 tesla.
Figure 15:
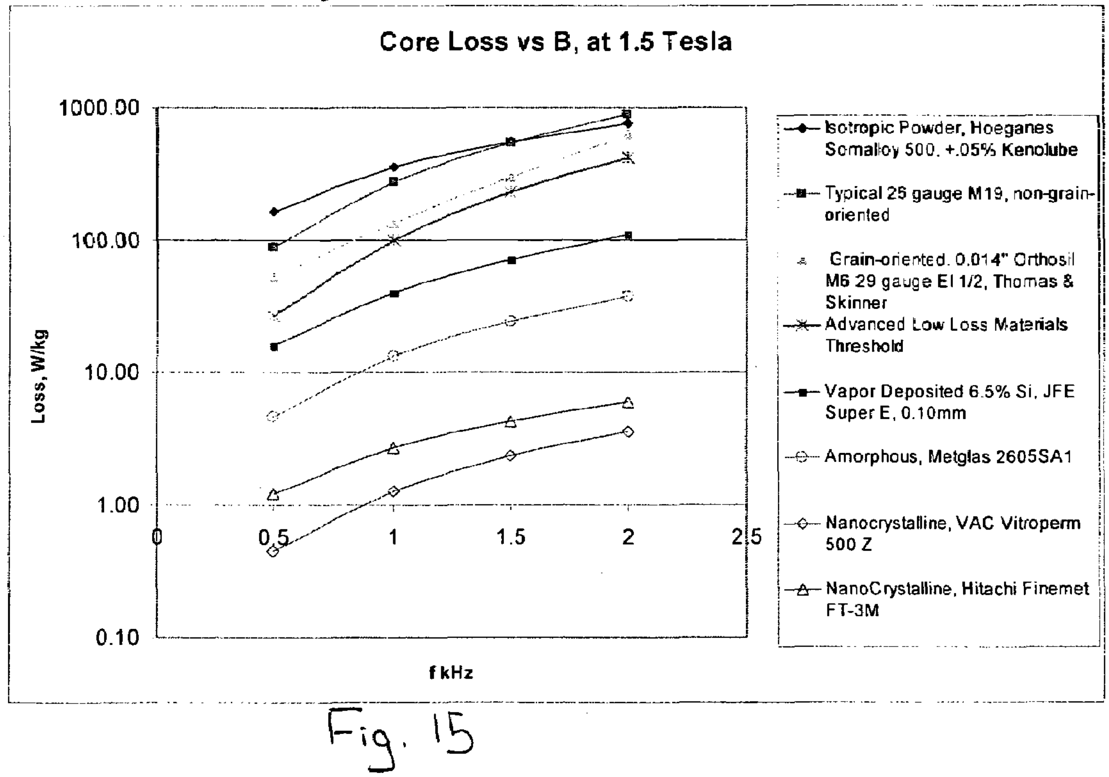
FIG. 15 shows a chart of core loss of various soft magnetic materials versus frequency, at 1.5 tesla.

Although the present invention has been described in considerable detail with reference to certain preferred versions thereof, other versions are possible. For example, FIG. 9 shows an embodiment of the invention where additional adjunct coils 63 are wound around the back yoke for an inductor. The additional coils 63 may be used for separate phases, or may be wound in conjunction with the coils existing around the teeth 24 for the advantages of better cooling, better use of space or better control of inductance. Furthermore, the additional coils 63 shown in FIG. 9 could entirely replace the coils wound around the teeth. As another example, although the disclosed embodiment shows eighteen total legs on the core, the number of legs may be increased or decreased, depending upon the desired size, shape and performance characteristics of the electric device. As yet another example, the cover iron may also include legs that extend away from the cover yoke and join to the legs extending from the back yoke. Alternatively, the back yoke could provide alternating legs that extend to the cover yoke, and the cover yoke could provide alternating legs that extend to the back yoke. In yet another embodiment, the cover yoke could be completely eliminated from the core. In another embodiment, the coils of the device could be wound upon the teeth in unconventional manners. For example, if the device is a multi-phase device, two or more coils for different phases may encircle the same tooth, and the respective position of the phase coils upon the teeth may change from tooth to tooth. As demonstrated herein, several different embodiments and versions of the soft magnetic core and associated electric device are possible, and variations on the disclosed embodiments are contemplated. Therefore, the spirit and scope of the appended claims should not be limited to the description of the preferred versions contained herein.

What is claimed is:

1. An energizable magnetic core for an electromagnetic device comprising, a. a back yoke comprised of an energizable magnetic material and having a back yoke inner face, the back yoke forming a loop such that the back yoke is arranged to provide a magnetic circuit;

b. a plurality of legs extending from the inner face of the back yoke in a direction substantially perpendicular to the inner face, each of the plurality of legs being comprised of an energizable magnetic material and having a first end adjacent to the back yoke and a second end extending away from the back yoke; and c. a cover yoke adjacent to the second end of each of the plurality of legs, the cover yoke being comprised of an energizable magnetic material and having a cover yoke inner face, and the cover yoke forming a loop such that the cover loop is arranged to provide a magnetic circuit, wherein the back yoke and cover yoke are disposed with their respective inner faces in axially facing relationship and the energizable magnetic materials of the back yoke, the plurality of legs, and the cover yoke consist essentially of advanced, low loss materials.

2. The magnetic core of claim 1 wherein the back yoke is comprised of energizable magnetic ribbon material wound in a toroid.

3. The magnetic core of claim 2 where the toroid is a ring.

4. The magnetic core of claim 1 wherein the back yoke is stationary.

5. The magnetic core of claim 1 wherein the back yoke is unitary in construction such that the loop formed by the back yoke is continuous.

6. The magnetic core of claim 5 wherein the back yoke and each of the plurality of legs of the back yoke are unitary in construction.

7. The magnetic core of claim 1 wherein the back yoke is unibody in construction.

8. The magnetic core of claim 7 wherein the back yoke and each of the plurality of legs are unibody in construction.

9. The magnetic core of claim 1 wherein the back yoke, plurality of legs or cover yoke are comprised of amorphous metal.

10. The magnetic core of claim 1 wherein the cover yoke is in contact with the second end of each of the plurality of legs.

11. The magnetic core of claim 1 wherein the back yoke includes at least one air gap designed to introduce magnetic reluctance to the magnetic circuit provided by the back yoke.

12. The magnetic core of claim 1 further comprising a plurality of coils, each of the plurality of coils being positioned upon one of the plurality of legs.

13. The magnetic core of claim 12 wherein the plurality of coils comprise a single phase winding.

14. The magnetic core of claim 12 wherein the plurality of coils comprise three phase windings.

15. The magnetic core of claim 1 wherein the plurality of legs comprise a first plurality of legs and the magnetic core further comprises a second plurality of legs extending from the inner face of the cover yoke in a direction substantially perpendicular thereto, the second plurality of legs formed of an energizable magnetic material, each of the second plurality of legs having a first end adjacent to the cover yoke and a second end extending away from the cover yoke.

16. The magnetic core of claim 15 wherein the second end of the second plurality of legs are positioned adjacent to the second end of the first plurality of legs.

17. The magnetic core of claim 1 wherein each of the plurality of legs are comprised from energizable magnetic ribbon material wound in a toroid.

18. The magnetic core of claim 17 where the toroid is a ring.

19. The magnetic core of claim 1 wherein each of the plurality of legs are formed as a separate piece from the back yoke.

20. The magnetic core of claim 19 wherein each of the plurality of legs are formed as a laminated stack of energizable magnetic material.

21. The magnetic core of claim 1 wherein an air gap is included between the cover yoke and the second end of each of the plurality of legs.

22. A method of introducing inductance into an electrical circuit comprising:

a. providing an inductor comprising:

(i) a magnetic core comprising (a) a back yoke comprised of an energizable magnetic material and having a back yoke inner face, the back yoke forming a loop such that the back yoke is arranged to provide a magnetic circuit, and (b) a plurality of legs extending from the inner face of the back yoke in a direction substantially perpendicular to the inner face, each of the plurality of legs being comprised of an energizable magnetic material and having a first end adjacent to the back yoke and a second end extending away from the back yoke, wherein the energizable magnetic materials of the back yoke and the plurality of legs consist essentially of advanced, low loss materials; and (ii) providing at least one winding wound around the magnetic core;

b. placing the inductor in the electrical circuit for the purpose of adding inductance to the electrical circuit; and c. introducing current into the at least one winding such that current flowing through the at least one winding adds inductance to the electrical circuit.

23. The method of claim 22 wherein the at least one winding is wound around the plurality of legs.

24. The method of claim 22 wherein the magnetic core further comprises a cover yoke adjacent to the second end of each of the plurality of legs, the cover yoke having a cover yoke inner face and being comprised of an energizable magnetic material consisting essentially of advanced, low loss material, and the back yoke and cover yoke being disposed with their respective inner faces in axially facing relationship.

25. The method of claim 22 wherein the back yoke is comprised of energizable magnetic ribbon material wound in a toroid.

26. The method of claim 22 wherein the back yoke is unitary in construction such that the loop formed by the back yoke is continuous.

27. The method of claim 22 wherein the back yoke and each of the plurality of legs of the back yoke are unitary in construction.

28. The method of claim 22 wherein the back yoke is unibody in construction.

29. The method of claim 28 wherein the back yoke and each of the plurality of legs are unibody in construction.

30. The method of claim 22 wherein the back yoke or plurality of legs are comprised of amorphous metal.

31. The method of claim 22 wherein each of the plurality of legs are formed as a separate piece from the back yoke.

32. The method of claim 22 wherein the back yoke includes at least one air gap designed to introduce magnetic reluctance to the magnetic circuit provided by the back yoke.

33. The method of claim 22 wherein the at least one winding comprises a single phase winding.

34. The method of claim 22 wherein the at least one winding comprises three phase windings.

35. A transformer comprising:

a. a back yoke cormprised of an energizable magnetic material and having a back yoke inner face, the back yoke forming a loop such that the back yoke is arranged to provide a magnetic circuit;

b. a plurality of legs extending from the inner face of the back yoke in a direction substantially perpendicular to the inner face, each of the plurality of legs being comprised of an energizable magnetic material and having a first end adjacent to the back yoke and a second end extending away from the back yoke;

c. a primary winding wound around at least one of the plurality of legs; and d. a secondary winding wound around at least one of the plurality of legs, wherein a first current flowing through the primary winding induces a second current in the secondary winding, wherein the energizable magnetic materials of the back yoke and the plurality of legs consist essentially of advanced, low loss materials.

36. The transformer of claim 35 wherein the at least one winding comprises three phase windings.

37. The transformer of claim 35 wherein each of the plurality of legs are formed as a separate piece from the back yoke.

38. The transformer of claim 35 further comprising a cover yoke adjacent to the second end of each of the plurality of legs, the cover yoke comprised of an energizable magnetic material.

39. The transformer of claim 35 wherein the magnetic core further comprises a cover yoke adjacent to the second end of each of the plurality of legs, the cover yoke having a cover yoke inner face and being comprised of an energizable magnetic material consisting essentially of advanced, low loss material, and the back yoke and cover yoke being disposed with their respective inner faces in axially facing relationship.

40. The transformer of claim 35 wherein the back yoke is comprised of energizable magnetic ribbon material wound in a toroid.

41. The transformer of claim 35 wherein the back yoke is unitary in construction such that the loop formed by the back yoke is continuous.

42. The transformer of claim 35 wherein the back yoke and each of the plurality of legs of the back yoke are unitary in construction.

43. The transformer of claim 35 wherein the back yoke is unibody in construction.

44. The transformer of claim 43 wherein the back yoke and each of the plurality of legs are unibody in construction.

45. The transformer of claim 35 wherein the back yoke or plurality of legs are comprised of amorphous metal.

46. The transformer of claim 35 wherein the back yoke includes at least one air gap designed to introduce magnetic reluctance to the magnetic circuit provided by the back yoke.

47. The transformer of claim 35 wherein the at least one winding comprises a single phase winding.

48. A method of transferring electric energy from a first circuit to a second circuit comprising:

a. providing a transformer comprising (i) a magnetic core comprising (a) a back yoke comprised of an energizable magnetic material and having a back yoke inner face, the back yoke forming a loop such that the back yoke is arranged to provide a magnetic circuit, and (b) a plurality of legs extending from the inner face of the back yoke in a direction substantially perpendicular to the inner face, each of the plurality of legs being comprised of an energizable magnetic material and having a first end adjacent to the back yoke and a second end extending away from the back yoke, wherein the energizable magnetic materials of the back yoke and the plurality of legs consist essentially of advanced, low loss materials;

(ii) providing a primary winding wound around the core; and (iii) providing a secondary winding wound around the core; and b. introducing a first current through the primary winding such that the first current flowing through primary winding induces a second current in the secondary winding.

49. The method of claim 48 wherein the magnetic core further comprises a cover yoke adjacent to the second end of each of the plurality of legs, the cover yoke having a cover yoke inner face and being comprised of an energizable magnetic material consisting essentially of advanced, low loss material, and the back yoke and cover yoke being disposed with their respective inner faces in axially facing relationship.

50. The method of claim 48 wherein the back yoke is comprised of energizable magnetic ribbon material wound in a toroid.

51. The method of claim 48 wherein the at least one winding comprises three phase windings.

52. The method of claim 48 wherein each of the plurality of legs are formed as a separate piece from the back yoke.

53. The method of claim 48 wherein the primary winding is wound around at least one of the plurality of legs.

54. The method of claim 48 wherein the secondary winding is wound around at least one of the plurality of legs.

55. The method of claim 48 wherein the back yoke is unitary in construction such that the loop formed by the back yoke is continuous.

56. The method of claim 48 wherein the back yoke and each of the plurality of legs of the back yoke are unitary in construction.

57. The method of claim 48 wherein the back yoke is unibody in construction.

58. The method of claim 57 wherein the back yoke and each of the plurality of legs are unibody in construction.

59. The method of claim 48 wherein the back yoke or plurality of legs are comprised of amorphous metal.

60. The method of claim 48 wherein the at least one winding comprises a single phase winding.

61. The method of claim 48 wherein the back yoke includes at least one air gap designed to introduce magnetic reluctance to the magnetic circuit provided by the back yoke.

* * * * *